Feb. 2, 1943. H. F. PATTERSON 2,309,864
POWER TRANSMISSION
Filed May 16, 1940 2 Sheets-Sheet 1

INVENTOR
Herbert F. Patterson.
BY
ATTORNEYS.

Feb. 2, 1943.   H. F. PATTERSON   2,309,864
POWER TRANSMISSION
Filed May 16, 1940   2 Sheets-Sheet 2

INVENTOR
Herbert F. Patterson
BY *Hamess, Luidi, Patt & Harris*
ATTORNEYS

Patented Feb. 2, 1943

2,309,864

UNITED STATES PATENT OFFICE 2,309,864

POWER TRANSMISSION

Herbert F. Patterson, Highland Park, Mich., assignor to Chrysler Corporation, Highland Park, Mich., a corporation of Delaware Application May 16, 1940, Serial No. 335,434

6 Claims. (Cl. 74—370)

This invention relates to improvements in variable speed transmission mechanisms of the type particularly adapted for use in motor vehicles.

The principal object of the invention is to provide an improved three speed transmission particularly adapted for use in medium or low priced cars having an overrunning intermediate speed ratio drive which may be brought into action for accelerating the car without the necessity of disengaging the vehicle clutch.

An additional object is to provide in a transmission of the aforesaid type a control means for the overrunning clutch by means of which the drive therethrough may be positively controlled.

Further objects and advantages of the invention will be apparent from the following description taken in conjunction with the accompanying drawings, in which:

Fig. 5 is a view similar to Fig. 4 but with the shift sleeve removed.

Figure 1:
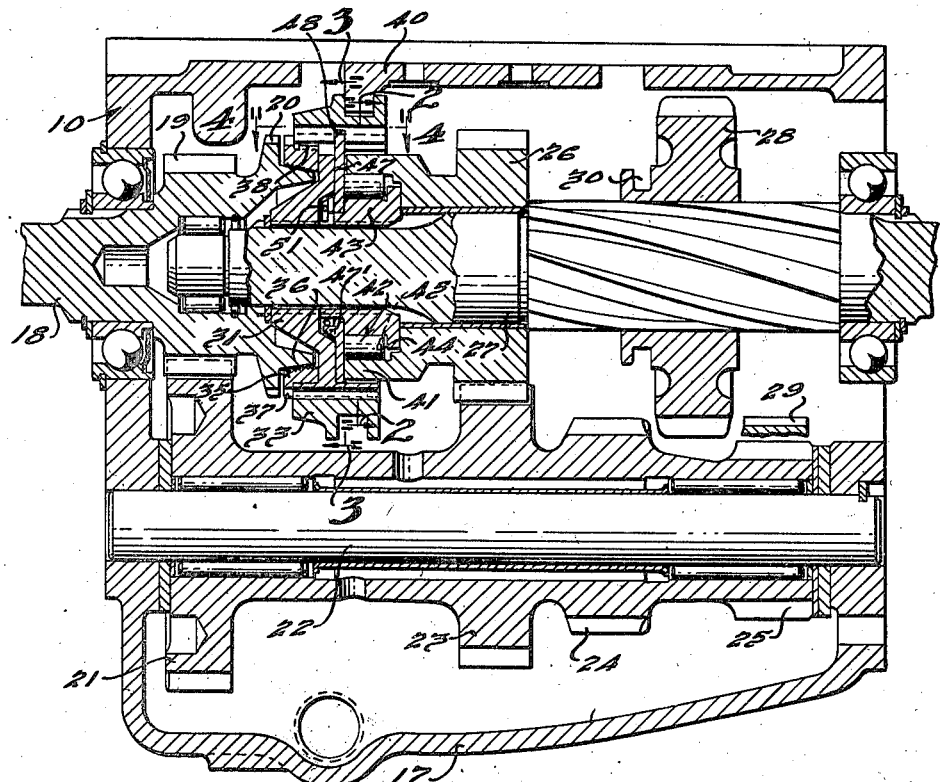
Fig. 1 is a longitudinal vertical sectional elevation of a power transmission embodying the present invention.
Figure 6:
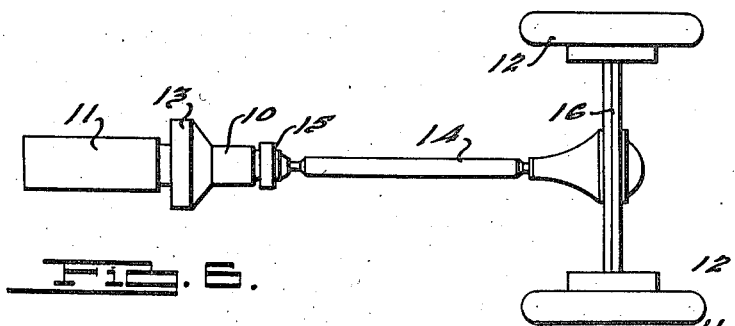
Fig. 6 is a diagrammatic plan view of a motor vehicle embodying the transmission of the present invention.

Referring to Figs. 1 and 6, it may be seen that the transmission 10 is interposed in the drive between the vehicle motor 11 and drive wheels 12, a suitable clutch 13 being provided to release the drive for shifting gears. A propeller shaft 14 connects the transmission 10 with the rear axle 16 through the usual differential mechanism, a propeller shaft brake 15 being provided for parking purposes.

The transmission 10 is contained within a casing 17 and comprises an input shaft 18 having a pinion 19 and a set of clutch teeth 20 formed thereon. The pinion 19 is in permanent mesh with a cluster gear 21 carried for rotation on a countershaft 22 mounted at each end in the casing 17. The countershaft gear cluster also comprises a second speed drive gear 23, a low speed gear 24 and a reverse drive gear 25. The gear 23 meshes with the second speed driven gear 26 which is journalled on the tail shaft 27, said shaft also carrying a low-reverse gear 28 which is splined thereon and is adapted to be shifted into mesh with gear 24 to establish low speed drive, or into mesh with reverse idler gear 29 to establish reverse drive, the latter gear being mounted adjacent gear 25 and in permanent mesh therewith.

The gear 28 is provided with a shift yoke receiving collar 30 which is adapted to receive the fingers of a shift yoke (not shown) for shifting in the usual manner.

Figure 2:
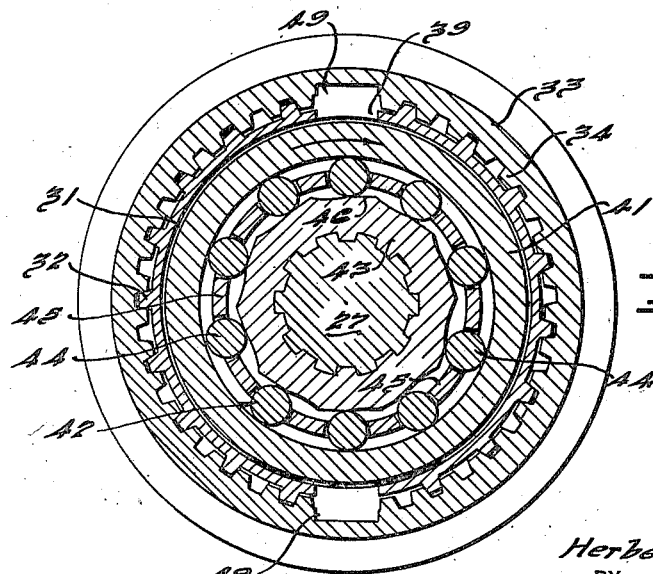
Fig. 2 is a sectional view taken approximately along the line 2—2 of Fig. 1 and looking rearwardly of the transmission.
Figure 3:
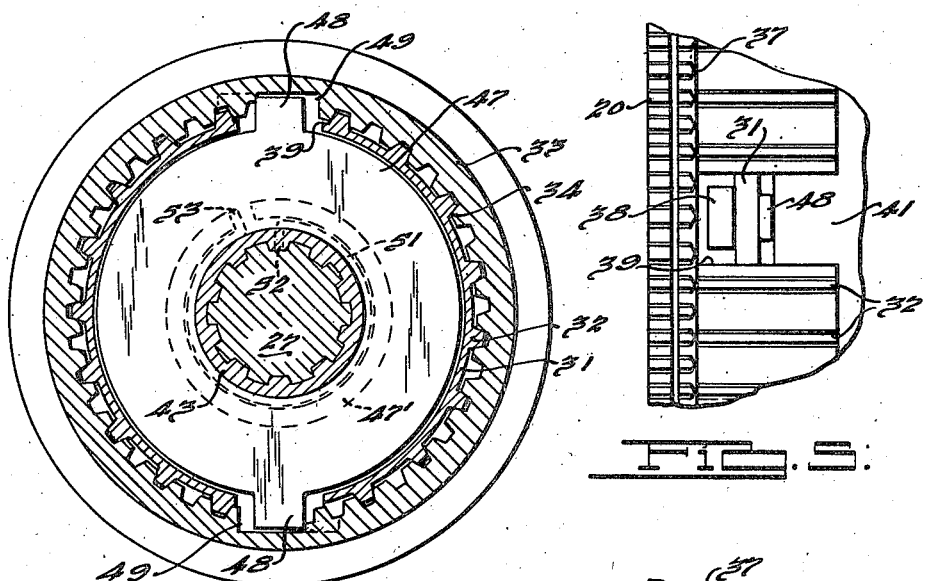
Fig. 3 is a sectional view taken approximately along the line 3—3 of Fig. 1 and looking forwardly of the transmission.
Figure 4:
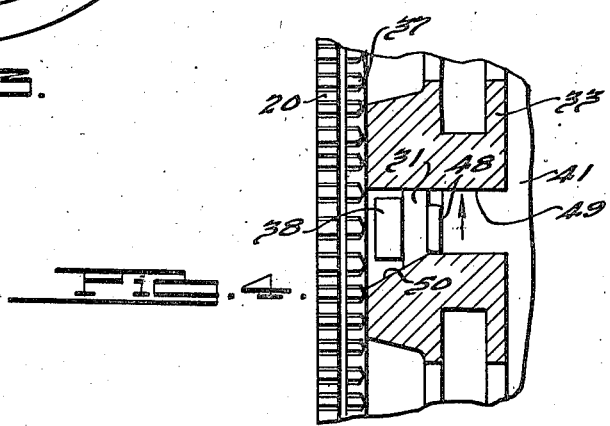
Fig. 4 is a sectional view taken along the line 4—4 of Fig. 1.

Referring now to Figs. 1 to 5, it will be seen that the shaft 27 has splined thereon a driving hub 31 having external teeth 32 (Fig. 5) on which is slidably carried a shift sleeve 33 having internal teeth 34 (Fig. 2) which mesh with the teeth 32. A blocker-type synchronizer ring 35 is carried on the cone-shaped portion 36 of shaft 18 and has a set of blocking teeth 37 which are adapted to block shift of sleeve 33 into engagement with the clutch teeth 20 except when the shafts 18 and 27 are rotating at the same speed. The ring 35 has a pair of diametrically oppositely disposed lugs 38 which project outwardly into the slots 39 provided in the hub 31 as shown in Figs. 2, 4 and 5.

The sleeve 33 is engaged by a shift yoke 40 which is adapted to be shifted by suitable mechanism (not shown) under control of the driver. When the shaft 27 is rotating, the lug 38 will engage one side of the slot 39 and the ring 35 will be carried around with the hub 31, the teeth 37 under such conditions being misaligned with the teeth 20 and 34 to thereby block shift of the sleeve 33.

Upon shift of the sleeve 33 forwardly to engage the teeth 20, the teeth 34 will first engage the teeth 37 which are misaligned therewith and the ring 35 will be forced on to the cone portion 36 with considerable pressure whereupon the shaft 18 will be slowed down and brought into synchronism with the shaft 27 (the main vehicle clutch having been previously disengaged). The speed of shaft 18 will tend to fall below that of shaft 27, which is driven by the momentum of the vehicle, and the ring 35 will thereby be moved to unblock the teeth 34 whereupon the sleeve 33 will slide into engagement with the clutch teeth 20 to establish direct drive. The hub 31 has alternate teeth removed to facilitate ease of shifting.

The second speed gear 26 has a forwardly extending sleeve portion 41 which forms the drive element of an overrunning roller clutch 42, the driven element thereof comprising a sleeve 43 splined on shaft 27 as illustrated. A set of rollers 44, carried by a cage 45, act to establish a one-way drive between the elements 41 and 43 when in such position that they engage the upwardly sloping portions of cams 46 formed on the element 43. When the rollers 44 are in contact with the low portions of cams 46, no drive will be transmitted in either direction.

The cage 45 is carried by a disc-like member 47 which is journalled on the element 43 and has a pair of diametrically oppositely outwardly extending lugs 48 which respectively extend into a pair of correspondingly located longitudinal slots 49 milled in the sleeve 33 in radial alignment with the slits 39 of hub 31. The slits 49, as illustrated in Figs. 3 and 4, are cut away in an oblique direction as indicated at 50 for a purpose which will be presently explained.

As shown in Figs. 1 and 3, a spring 51 of the expansion type has one end engaged with the clutch element 43 at 52, the other end thereof engaging a slot 53 provided in the forward collar portion 47' of the disc 47. The spring 51 constantly urges the disc 47 in a counterclockwise direction as viewed in Fig. 3 thereby tending to maintain the rollers 44 of overrunning clutch 42 in engagement with the upwardly sloping or drive portions of cams 46.

When the sleeve 33 is in the position shown in the drawings with the lugs 48 in engagement with the straight side portions of the slots 49, the spring 51 is contracted and the disc 47 is in such position that the rollers 44 are free to roll on the low portions of cams 46. Thus, no drive will be transmitted through clutch 42 and this position of the sleeve corresponds to neutral in conventional transmissions. When the sleeve 33 is shifted forwardly to clutch with the teeth 20, the lugs 48 are still engaged with the straight portions of slots 49 and the rollers 44 are thus retained in non-driving position during direct drive setting of the transmission. When sleeve 33 is shifted rearwardly of neutral position, the lugs 48 then engage the inclined portions 50 of slots 49 and the disc 47 and cage 45 is rotated clockwise of Fig. 2 thereby to engage the rollers 44 of clutch 42 in driving relation relative to clutch elements 41 and 43. This position of sleeve 33 corresponds to second or intermediate speed ratio position in conventional transmissions and upon rotation of shaft 18, a one-way drive will be transmitted to shaft 27 through pinion 19, gears 21, 23 and 26 and clutch 42.

It is apparent that the drive in second speed ratio is a free wheeling drive in the forward direction, the shaft 27 overrunning the gear 26 during tendency of the shaft 27 to rotate faster than the shaft 18 such as during coast of the vehicle. The free wheeling drive is effective in second speed ratio only, the disc 47 functioning as explained above to lock the rollers 44 out of driving engagement in all other speeds.

It may therefore be readily seen that the present improved transmission does not require any different technique on the part of the vehicle driver than is required for driving vehicles equipped with conventional transmissions. However, the present transmission possesses a distinct advantage over conventional mechanisms in that the shift from second or intermediate speed to high or direct speed drive may be made without the necessity of disengaging the main vehicle clutch, it being necessary only to release the driving torque momentarily, preferably by closing the throttle for an instant, whereupon the shaft 27 will overrun and the sleeve 33 may be shifted into engagement with the teeth 20, the blocker-synchronizer ring 35 functioning to prevent clashing and facilitating a smooth and rapid shift. As the sleeve 33 is moved from its extreme rearward position, at which position the rollers 44 are in driving position, to its extreme forward position for establishing direct drive, the disc 47 is rotated clockwise of Fig. 3 through the action of the slots 49, the inclined portions 50 of which exert a thrust on the lugs 48 during forward movement of the sleeve which rotates the disc 47 against the force of spring 51. As is apparent from Fig. 4, the lugs 48 will be cammed in the direction indicated by the arrow on Fig. 4 during the movement of sleeve 33 from second speed position to neutral position by the inclined portions 50 of slots 49, the lugs being thereafter held in the neutral position by the straight portions of the slots. Similarly, when the sleeve 33 is shifted to second speed position, the lugs 48 will be moved in the opposite direction as permitted by the portions 50 under the influence of the spring 51.

The present improved transmission mechanism is particularly well adapted to use with power shifting devices such as, for example, fluid servo-motors and solenoids, it being apparent that shifting between high and second speed ratio positions may be accomplished simply by releasing the driving torque of shaft 18 momentarily.

While I have described only one preferred embodiment of my invention, it is to be understood that various changes therein will be readily apparent to those skilled in the art and I do not intend to limit the invention in its broader aspects except as set forth in the claims appended hereto.

I claim:

1. In a motor vehicle drive, a driving shaft, a driven shaft aligned therewith, means including a gear train intermediate said shafts for driving said driven shaft at a speed slower than that of said driving shaft, said intermediate driving means including an overrunning clutch having a drive element carried by said gear train, a driven element carried by said driven shaft, and a plurality of rollers adapted to wedge with said elements thereby to provide a one-way overrunning drive connection between said shafts; a shift sleeve adapted to be shifted in one direction from neutral to establish a direct driving connection between said shafts and in the opposite direction from neutral to establish said slow speed drive; and control means for said overrunning clutch operably associated with said sleeve, said control means being operable to prevent wedging of said rollers when said sleeve is in neutral position.

2. In a motor vehicle power transmission having a drive shaft and a driven shaft, means including a shiftable gear for connecting said shafts for low speed ratio drive and for reverse drive respectively; means for connecting said shafts for direct drive; means including a roller clutch for connecting said shafts for intermediate speed ratio drive, said clutch including a roller carrying cage and spring means operably connected thereto for urging said clutch into driving position; a shift sleeve operable when shifted from neutral to respectively establish said intermediate and direct ratio drives; and means operably connecting said cage and said sleeve for moving said clutch to non-driving position in response to shift of said sleeve out of intermediate speed ratio driven position.

3. In a motor vehicle power transmission having a driving shaft and a driven shaft, means for driving said driven shaft from said driving shaft including a gear journalled on said driven shaft; means for drivingly connecting said gear to said shaft comprising an overrunning clutch having a driving element carried by said gear and a driven element carried by said shaft; a roller structure including a cage operatively disposed between said clutch elements; a shift member; and means interconnecting said member and cage for controlling the position of said cage in response to shift of said member.

4. In a motor vehicle power transmission having a driving shaft and a driven shaft, means for driving said driven shaft from said driving shaft including a gear journalled on said driven shaft; means for drivingly connecting said gear to said shaft comprising an overunning clutch having a driving element carried by said gear and a driven element carried by said shaft; a set of rollers operatively disposed between said clutch elements; a spring for urging said rollers into driving engagement with said clutch elements; and means for moving said rollers against said spring into non-driving position including a shift member shiftable axially of said shafts.

5. In combination with a pair of co-axial power transmitting shafts, juxtapositioned sets of clutch teeth carried by said shafts; a sleeve shiftable from neutral non-driving position to a position bridging said sets of clutch teeth thereby to establish a direct drive between said shafts; means including a gear journalled on one of said shafts for driving said one shaft from and at a reduced speed with respect to the other shaft; means for clutching said gear to said one shaft comprising an overrunning clutch having a cage carrying clutching rollers; yieldable means for urging said cage and rollers into driving position; a lug on said cage; a slot in said sleeve for receiving said lug; said slot being so constructed and arranged with respect to said lug that said cage and rollers will be held in non-driving position when said sleeve is in its neutral and direct drive positions.

6. In combination with a pair of co-axial power transmitting shafts, juxtapositioned sets of clutch teeth carried by said shafts; a sleeve shiftable from neutral non-driving position to a position bridging said sets of clutch teeth thereby to establish a direct drive between said shafts; means including a gear journalled on one of said shafts for driving said one shaft from and at a reduced speed with respect to the other shaft; means for clutching said gear to said one shaft comprising an overrunning clutch having a driving element carried by said gear and a driven element carried by said shaft; a plurality of clutching rollers disposed between said elements and operable when in clutching position to permit said shaft to overrun said gear but preventing overrun of said gear relative to said shaft; means for moving said rollers to neutral position wherein no drive will be transmitted through said clutch comprising a cage for controlling the position of said rollers, and means connecting said cage and said sleeve operable by said sleeve in response to shifting movement thereof.

HERBERT F. PATTERSON.

CERTIFICATE OF CORRECTION.

Patent No. 2,309,864.  February 2, 1943.

HERBERT F. PATTERSON.

It is hereby certified that error appears in the printed specification of the above numbered patent requiring correction as follows: Page 1, first column, line 53, before the word "gear" first occurrence, insert --drive--; page 2, first column, line 14, for "slits" both occurrences, read --slots--; page 3, first column, line 2, for "driven" read --drive--; and that the said Letters Patent should be read with this correction therein that the same may conform to the record of the case in the Patent Office.

Signed and sealed this 30th day of March, A. D. 1943.

(Seal)

Henry Van Arsdale.
Acting Commissioner of Patents.